J. A. BOW, P. THILL & A. E. WHEELER.
FURNACE CONSTRUCTION.
APPLICATION FILED DEC. 17, 1914.
1,191,271.
Patented July 18, 1916.
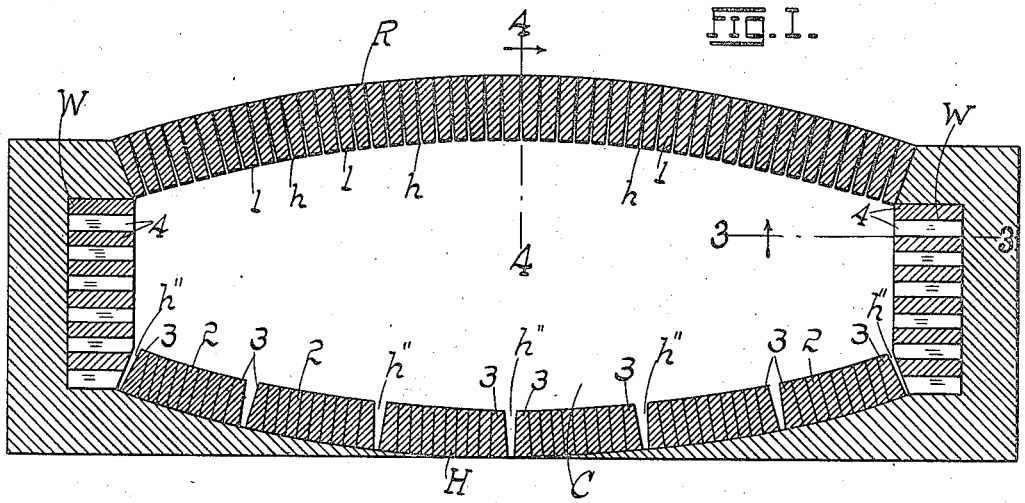
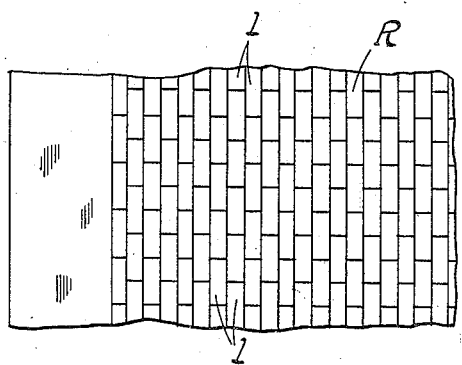
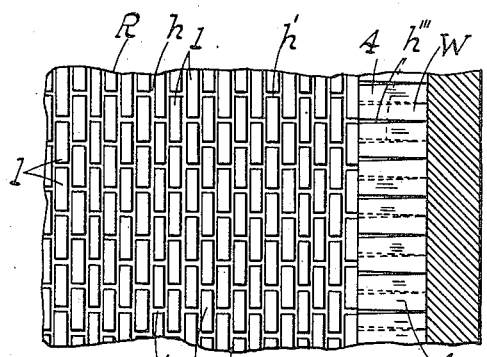
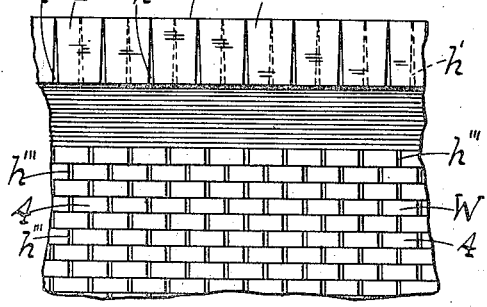
WITNESSES:
INVENTORS.
James A. Bow,
Peter Thill and
Archer E. Wheeler.
ATTORNEY.

J. A. BOW, P. THILL & A. E. WHEELER.
FURNACE CONSTRUCTION.
APPLICATION FILED DEC. 17, 1914.
1,191,271.
Patented July 18, 1916.
4 SHEETS—SHEET 2.
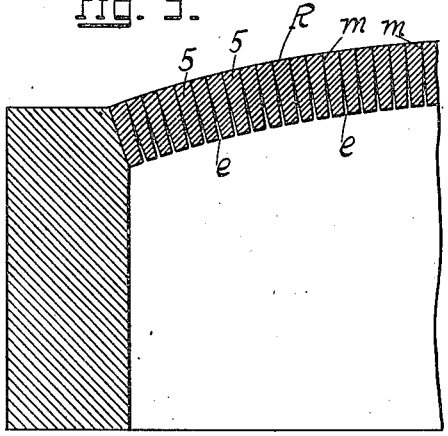
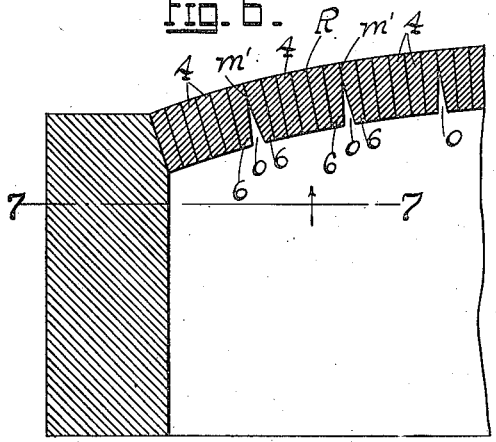
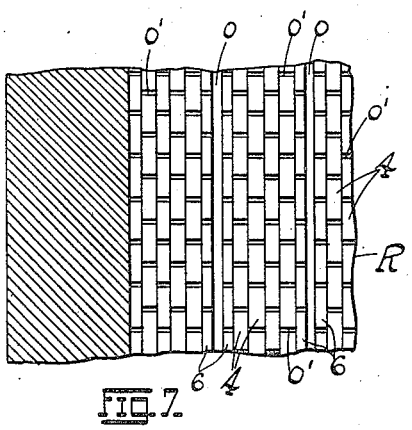
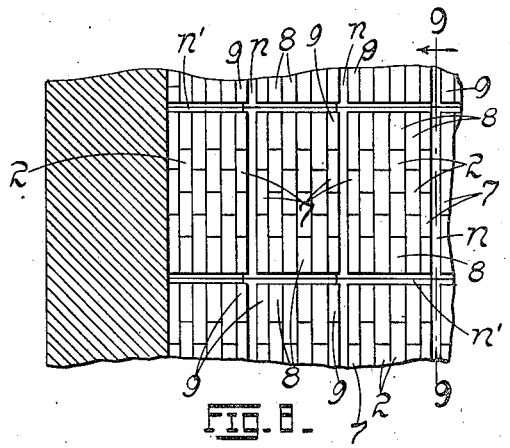
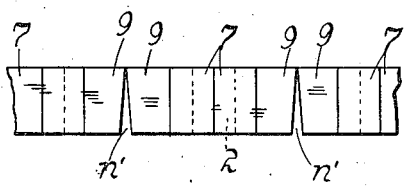
WITNESSES:
INVENTORS.
James A. Bow,
Peter Thill
Archer E. Wheeler
BY
ATTORNEY.

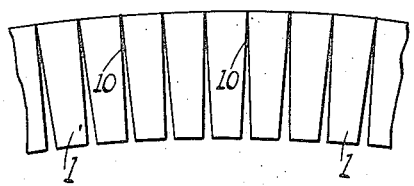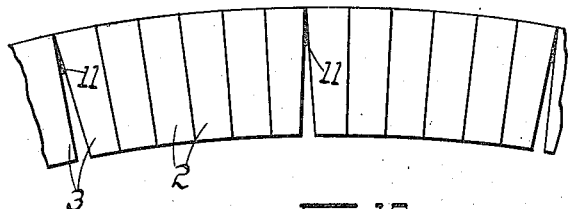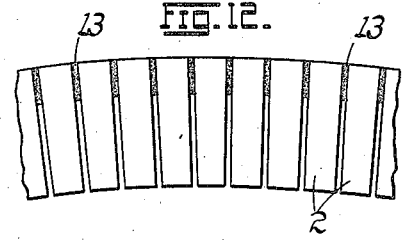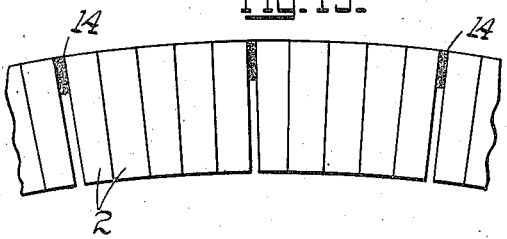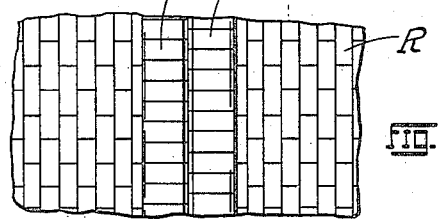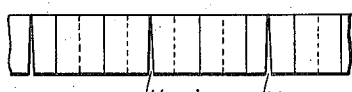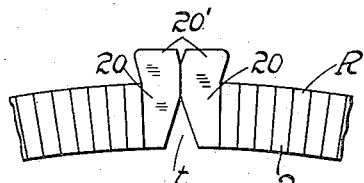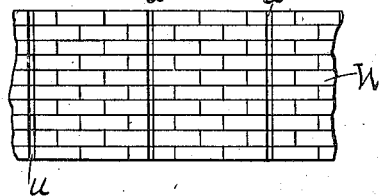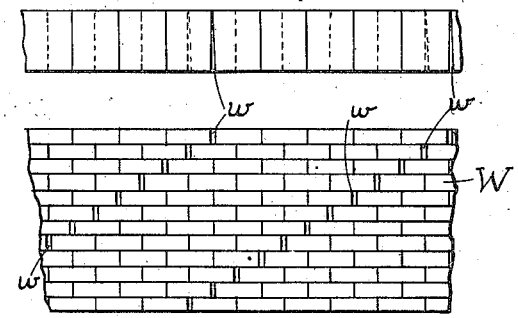

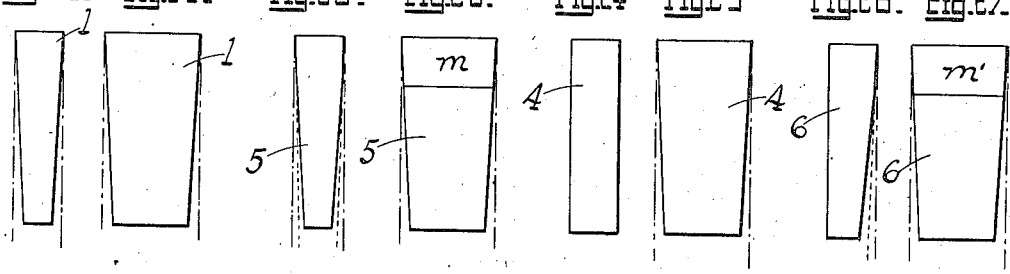
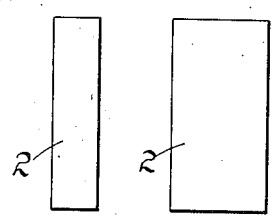
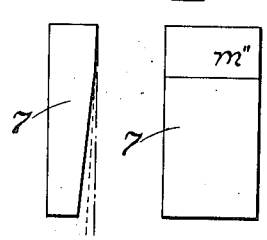
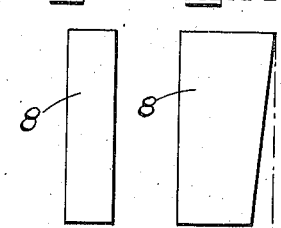
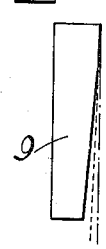
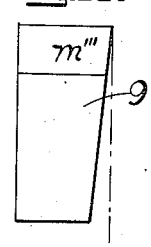
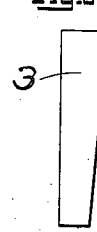
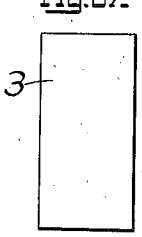
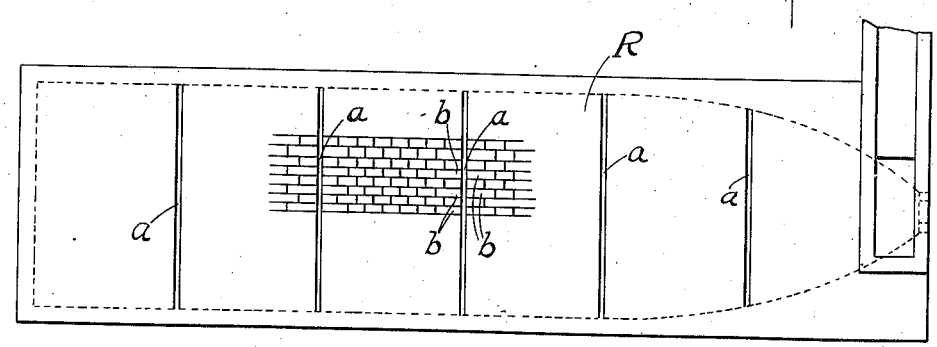

UNITED STATES PATENT OFFICE.

JAMES A. BOW AND PETER THILL, OF GREAT FALLS, MONTANA, AND ARCHER E. WHEELER, OF LONDON, ENGLAND.

FURNACE CONSTRUCTION.

1,191,271.  Specification of Letters Patent.  Patented July 18, 1916.

Application filed December 17, 1914.  Serial No. 877,706.

*To all whom it may concern:*

Be it known that we, JAMES A. BOW, PETER THILL, and ARCHER E. WHEELER, citizens of the United States, the said JAMES A. Bow and PETER THILL residing at Great Falls, in the county of Cascade, State of Montana, and the said ARCHER E. WHEELER residing in London, England, have invented certain new and useful Improvements in Furnace Constructions, of which the following is a full, clear, and exact description, reference being had to the accompanying drawings, forming a part hereof.

Our invention has relation to improvements in the construction of brick furnaces generally, and reverberatory furnaces in particular, the improvement necessarily depending not only on the special form of brick employed, but on the matter of laying the same, as will hereinafter more fully appear.

The invention is not restricted in its application to any particular part of the furnace, but may be availed of in the construction of walls, arches, inverted arches, floors, or in fact any other member or portion of the furnace subjected at one time to different degrees of temperature and liable to suffer different degrees of expansion and contraction as a result thereof.

The object of the invention is to provide a brick or bricks of a shape, which when the bricks are laid, will serve to overcome certain objections inherent in present and prevailing forms of furnace constructions and resulting from the use of a brick which can not successfully respond to variations of temperature under the heat to which the furnace charge is subjected.

A further object is to overcome these objections by a cheap, easy and convenient method, and without too costly and complicated constructions or methods of binding, and without destroying the integrity of the brick construction.

A further object is to take care of all differential expansion in the most logical and scientific manner.

The basic principle of the present invention resides in the provision of initial open joints (between the bricks) facing the region of highest temperature or treatment chamber of the furnace, these joints permitting the hot ends of the bricks to expand freely without materially affecting the cooler and contacting ends of the bricks, that is to say without opening joints between the contacting faces of the bricks farthest removed from the region of high temperature referred to, and hence without destroying or disturbing the integrity of the member (be it a wall, roof, floor, arch or the like) suffering differential expansion.

The advantages of the invention will be better apparent from a detailed description thereof in connection with the accompanying drawings, in which—

Figure 1 is a vertical cross-section of a conventional reverberatory furnace, taken through the treatment chamber and hearth, showing one application of our invention; Fig. 2 is a top plan of the roof of the furnace; Fig. 3 is a horizontal section on the line 3—3 of Fig. 1, looking up; Fig. 4 is a vertical longitudinal section through the roof or arch of the line 4—4 of Fig. 1; Fig. 5 is a cross-section taken through the roof or arch of the furnace, on the order of the section shown in Fig. 1, showing however, a slightly different construction of brick; Fig. 6 is a section similar to Fig. 5 showing a further modification of brick; Fig. 7 is a horizontal section on the line 7—7 of Fig. 6 looking up; Fig. 8 is a horizontal section corresponding to Fig. 7, showing however a modified method of longitudinal and transverse roof-expansion; Fig. 9 is a vertical longitudinal section through the roof on the line 9—9 in Fig. 8, taken however in the plane of the joint between adjacent courses of bricks; Fig. 10 is a diagrammatic illustration of a cross-section of roof showing a method of brick-laying and form of brick substantially as indicated in Fig. 1; Figs. 11, 12 and 13 are diagrammatic illustrations on the order of Fig. 10, showing various modifications; Fig. 14 is a diagrammatic illustration on the order of Fig. 10 showing a modification contemplating a special key; Fig. 15 is a top plan of Fig. 14; Fig. 16 is a diagrammatic inside elevation of a wall construction showing a series of vertical continuous expansion joints; Fig. 17 is a top plan of Fig. 16; Fig. 18 is a diagrammatic inside elevation of a wall showing a series of discontinuous individual vertical joints; Fig. 19 is a top plan of Fig. 18; Figs. 20 and 21 are side and face views of a wedge brick having two single tapers for each side and face; Figs. 22 and 23 are corresponding views of a brick having both sides double-tapered and faced with two single tapers; Figs. 24 and 25 are corresponding views of a brick having a face with two single tapers; Figs. 26 and 27 are corresponding views of a brick showing a double taper all on one side and with face having two single tapers; Figs. 28 and 29 are corresponding views of a "straight" or brick without taper; Figs. 30 and 31 are corresponding views of a brick with double taper all on one side, but with face without taper; Figs. 32 and 33 are corresponding views of a brick with face having a single taper; Figs. 34 and 35 are corresponding views showing a double taper all on one side, and with face having a single taper; Figs. 36 and 37 are corresponding views showing a single taper on one side and with non-tapering face; Fig. 38 is a diagrammatic side view showing a modification having single taper on one side and double taper on the opposite side; and Fig. 39 is a diagrammatic plan view of the furnace showing the present disposition of continuous cross joints to allow for longitudinal expansion of the roof.

In order that we may understand the full import of the present invention, it is desirable that we first explain in a general way, the usual method of reverberatory roof arch construction. For our present purpose we may assume the general shape of the main part of the roof to be substantially rectangular and oblong in plan (Fig. 39). Referring to the drawings, (and for the present to Figs. 1 to 19 inclusive and to Fig. 39), it will be seen that the roof R consists of an arch sprung crosswise over the furnace, and extends continuously the full length of the furnace, the common practice being to make the "rise" one-twelfth of the "span". The bricks are laid radially so that the thickness of the arch represents the length of the brick (the arch being made one brick in thickness only). Usually the bricks are all laid in longitudinal courses so that the longitudinal joints are continuous and the cross-joints are broken at every course. The bricks are laid so that the width of the brick is lengthwise of the furnace and the thickness of the brick represents the width of the course. It might be mentioned, that, to provide for longitudinal expansion in the usual method of construction, straight open joints $a$ extend at intervals across the roof from skewback to skewback, the edges of these joints being made straight by providing a brick $b$ at every alternate course one and one-half times the width of the regular brick (Fig. 39). With the exception of these open cross-joints, the bricks are laid in contact for their full length from end to end, or from top to bottom of the arch, and on all sides; so that there are no open joints at either the top or bottom of the arch except the cross-joints $a$ referred to, said joints ($a$) of course extending clear through the arch and being usually two or three inches in width. As the bricks are laid radially or on end, they should theoretically be all wedges; but for practical reasons they are usually in the proportion of three or more straights to one wedge, the wedge being sufficiently beveled to compensate for the straights, so that the joints are for the most part not exactly radial, but nearly so. In the old form of construction there are no open joints on the bottom or under side of the arch, nor are there any on the upper side when the furnace is first built (excepting of course the joints $a$ above referred to); and when the furnace is heated up, the inner or under side of the roof is heated much in excess of the outer or upper side, and consequently expands more. The greater expansion of the lower ends of the bricks (which must be allowed for by letting out the skewbacks to allow the roof to expand laterally as a whole) causes all the joints on the upper side to open. This throws the line of pressure of the arch to the lower side, making the arch unstable; besides putting the strain on that part of the brick which is hottest and therefore least able to withstand the pressure. Longitudinally of course the roof is permitted to expand between the open cross-expansion joints $a$, causing the latter to close. In this longitudinal expansion the upper cool ends of the bricks do not expand much compared to the lower hot ends, and thus open joints are caused in a cross-wise or transverse direction. Usually, fine sand is spread over the roof to fill these joints and prevent too much leakage of air, the cross-joints $a$ being covered over with loose bricks during the heating of the furnace, for the same purpose.

From the foregoing, it is apparent that the prevailing system as now generally practised possesses decided disadvantages: (1) Considerable latitude must be allowed for in letting out the skewbacks, or the buckstays, requiring constant and careful attention during the heating up and the cooling down periods; (2) the roof is unstable during the above occasions, and during the time that it is heated up; (3) the maximum strength of the brick is not obtained, because, when heated up, the line of pressure is on the lower end, that is, on that portion which is hottest, and therefore least able to withstand much pressure; (4) longitudinal expansion must be provided for by special transverse joints at intervals along the roof, thus destroying the continuity of the roof; and (5) when heated up, the roof permits of considerable leakage of air, due to the open joints on the upper side not being properly filled with sand.

In the method of construction provided for in our invention as applied to reverberatory roofs, the general method of laying and bonding the brick is the same as in the old construction, except that, when first built—(1) while the bricks are all in contact on all sides at the upper or outer side, the joints are all open (or there are open joints at intervals) at the lower or inner side; and (2) no through expansion joints across the roof need be provided for longitudinal expansion of the roof. The new method permits the use of bricks of various shapes to be presently referred to in detail, all however having the characteristic of presenting open joints to the treatment chamber, and contacting on all sides at the upper ends or the ends farthest removed from said chamber. For the present we will refer specifically to Figs. 1 to 4 inclusive. Therein we find the roof R composed of a series of bricks 1, having two single tapers for each side and face as detailed in Figs. 20 and 21, such construction resulting in the formation of a series of longitudinal expansion joints $h$ on the under side of the roof or the side facing the treatment chamber C, and of a series of transverse expansion joints $h'$ likewise facing the chamber C; and while the joints $h$ are continuous, the joints $h'$ are obviously broken by the bricks of the successive courses breaking joint with one another (Fig. 3). The upper or outer ends of the bricks, that is to say the ends farthest from the chamber C contact with one another on all sides as shown to best advantage in Fig. 2. The hearth H is shown as of the inverted arch type (Fig. 1) and is composed of a combination of straights 2 (or brick having no taper) with tapered members 3 at regular intervals forming longitudinal expansion joints $h''$ distributed along the hearth and at the sides, said joints $h''$ likewise facing the treatment chamber C. The bricks 2 are detailed in Figs. 28 and 29, and the bricks 3 are detailed in Figs. 36 and 37. The inner vertical walls W of the treatment chamber are built up of bricks 4 having parallel faces with two single tapers, thereby forming staggered vertical expansion joints $h'''$ likewise facing the treatment chamber C (Figs. 3, 4). These bricks are detailed in Figs. 24 and 25.

In Fig. 5 we show a roof construction composed of a series of brick 5 with both sides double tapered and faces with two single tapers detailed more particularly in Figs. 22 and 23. These give rise to a series of longitudinal continuous expansion joints $e$ (and obviously to broken or interrupted transverse joints on the order of $h'$ illustrated in Fig. 3) facing the fire or treatment chamber C, the upper or outer portions of the bricks contacting all around along the upper portions of their sides and along the upper portions or sections $m$ of their faces (Fig. 23).

In Figs. 6 and 7 we show a roof having sections composed of brick such as 4 (detailed in Figs. 24 and 25) the adjacent members of the successive sections being formed of bricks 6, detailed in Figs. 26 and 27, that is to say, the brick is provided with a double taper on one side only, and with a face having two single tapers. The bricks 6 of adjacent sections engage one another along the outer facets $m'$ of their opposing faces, successive bricks 6 of any series engaging one another along the upper portions of their sides contiguous to the facets $m'$, the plane faces of the bricks (6) engaging their full length the corresponding faces of the bricks 4. By this arrangement there are formed a series of longitudinal expansion joints $o$ which are intersected by a series of staggered cross or transverse joints $o'$.

In Figs. 8 and 9 we show a roof having sections composed of brick 2 (detailed in Figs. 28, 29), forming the main portion of the roof, the members 2 being bounded by bricks 7 (detailed in Figs. 30, 31), disposed longitudinally thereof, by bricks 8 (detailed in Figs. 32, 33), disposed transversely thereof, and by corner bricks 9 (detailed in Figs. 34, 35). The bricks 7 and 9 are disposed on opposite sides of the longitudinal expansion joints $n$, the bricks 7 contacting along the facets $m''$ at said joints, and the bricks 9 contacting along the facets $m'''$. The bricks 8, 9, on the other hand are properly beveled to form the inner transverse expansion joints $n'$.

From the foregoing it will be seen that we may form a variety of inner expansion joints depending on the specific construction of brick employed. Thus, in Fig. 3 we have a joint between successive courses of brick, the longitudinal joints being continuous, whereas the transverse joints are interrupted; in Fig. 4 we have a series of vertical staggered joints; in Fig. 5 we have a series of inner open joints on the order shown in Figs. 1 and 3; in Figs. 6 and 7 we have a series of longitudinal parallel open joints disposed at intervals, and a series of staggered cross-joints between successive bricks; in Figs. 8 and 9 a series of longitudinal joints disposed at intervals intersected by transverse joints at intervals. The system is susceptible of indefinite expansion, depending on the shape of bricks employed, but in each case the construction is characterized by an inner open joint to provide for differential expansion under the heat of the furnace, the parts of the bricks farthest from the source of heat, that is to say, the coolest portions of the bricks being in contact or close jointed. The manner of joining the cooler ends of the bricks is illustrated more or less diagrammatically in Figs. 10 to 13 inclusive. Thus in Fig. 10 we show a suitable depth of clay filling 10 between adjacent faces of two-side single tapered bricks; in Fig. 11 we show a corresponding clay filler 11 at the base of the expansion joint of one-side single tapered bricks; in Fig. 12 we show a filler of slate 13 at the bases of joints formed by a series of what might be "straights" or other form of bricks; and in Fig. 13 we show a slate or other filler 14 at the bases of open joints disposed at intervals as already fully described.

As indicated above, the system is susceptible of indefinite expansion; and in Figs. 14 and 15 we show a form of reverberatory roof R in which we provide a single expansion longitudinal joint $t$ at the center of the roof, a large special brick or key composed of two sections 20, 20, with outwardly flaring extensions 20', 20', above the roof being employed to prevent dropping through the roof. In Figs. 16 and 17 we provide the furnace wall W with suitable brick so as to form a series of continuous vertical open joints $u$ distributed at intervals, and in Figs. 18 and 19 we provide the said wall with discontinuous joints $w$, horizontal joints in the walls being unnecessary. The special brick B in Fig. 38 is not represented in any of the constructions described or referred to, but is incidentally illustrated to show the possibilities of our new system.

It will be seen from the foregoing that the upper or outer portion of the beveled brick (which is considerably less than one-half the length of the brick) has the same shape as the ordinary arch brick; but the lower or inner portion is gradually tapered from the upper part to the bottom. When these bricks are laid with the upper parts in contact radially with one another, from the top to the dividing line between the upper and lower parts, there will be sufficient of an open joint at the bottom to allow for all the differential lateral expansion and pressure resulting from the heating up of the furnace. The principle of the feature of radial contact in the upper portion of the brick is that it gives a definite surface for taking the thrust of the arch, and at the same time allows the tapered open joint on the lower side. The usual varieties of brick entering into the construction of the roof and hearth are straights, wedges with single or double taper, and wedges with faces beveled on one or both sides, all as fully illustrated in Figs. 20 to 38 inclusive. So too, the intervals of the joints and their general disposition may vary as obvious from the illustrations. The longitudinal expansion of the roof is taken care of by the cross-joints such as $h'$ (Fig. 4) or their equivalents, the roof thereby dispensing with the transverse open continuous joints $a$ (Fig. 39) which are so common in prevailing constructions of furnaces and so objectionable in practice.

The beveled bricks herein employed while serving their desired purpose of roof constructions, have their virtue in wall constructions, in that they take care of longitudinal expansion as fully illustrated in Figs. 3, 4, and 16 to 19 inclusive. In this case the only open joints would be the vertical ones as it would be impractical to have open horizontal joints; besides, vertical expansion would not be so serious a problem to contend with.

Of course what constitutes the "upper" or outer portion of a brick in the roof, would be the lower or outer portion of the brick in the hearth, the roof forming the top of the treatment chamber and the hearth forming the bottom thereof, and wherever the term "upper" is used herein, it is to be understood as pertaining not only specifically to a brick of the roof, but to any brick in the furnace, said term "upper" to designate the part of the brick farthest from the source of heat, or the cooler end of the brick.

Obviously, the invention is not to be considered as restricted in its application to "furnaces"; and the term "brick" is to be considered as any member natural or artificial which may enter as an element of construction into any wall, roof, hearth, partition and the like, where it may serve to fulfil the functions designated therefor in the present invention. By "wall" as used herein, is meant any portion of the structure into which the brick enters as an element, and wherein one side is subjected to a different temperature from the opposite side, and thereby suffering a differential expansion and contraction.

Having described our invention, what we claim is:

1. In a furnace of the character described, a roof provided with longitudinally disposed expansion joints opening into the treatment chamber, and transverse joints likewise opening into said chamber, the several joints being closed to the atmosphere.

2. In a furnace of the character described, a roof composed of bricks bonded and laid in courses and forming longitudinal and transverse expansion joints opening into the treatment chamber, and means for closing said joints to the atmosphere.

3. In an arch or roof of a furnace of the character described, a pair of bricks positioned to form a joint opening into the treatment chamber but closed to the atmosphere, and means on the bricks outside the roof for preventing the bricks from dropping into the treatment chamber.

4. In a furnace of the character described, a roof provided with longitudinally disposed expansion joints opening into the treatment chamber, and transverse joints intersecting the longitudinal joints and likewise opening into said chamber, the several joints being closed to the atmosphere.

5. In a furnace of the character described, a roof composed of bricks bonded and laid in courses and forming longitudinal and transverse expansion joints opening into the treatment chamber, the joints being closed at points farthest away from the treatment chamber.

In testimony whereof we affix our signatures in presence of two witnesses.

JAMES A. BOW.
PETER THILL.
ARCHER E. WHEELER.

Witnesses for James A. Bow and Peter Thill:
M. A. PESTANA,
ROY A. LORMOTTE.

Witnesses for Archer E. Wheeler:
F. W. SNOW,
J. E. KIDD.